United States Patent
Sabi et al.

(10) Patent No.: US 6,845,076 B1
(45) Date of Patent: Jan. 18, 2005

(54) OPTICAL RECORDING MEDIUM AND OPTICAL RECORDING METHOD

(75) Inventors: Yuichi Sabi, Tokyo (JP); Akio Yasuda, Stuttgart (DE); Masanobu Yamamoto, Kanagawa (JP); Dieter Neher, Potsdam (DE)

(73) Assignees: Sony Corporation, Tokyo (JP); Sony International (Europe) GmbH, Berlin (DE)

( * ) Notice: Subject to any disclaimer, the term of this patent is extended or adjusted under 35 U.S.C. 154(b) by 297 days.

(21) Appl. No.: 10/168,030
(22) PCT Filed: Oct. 18, 2000
(86) PCT No.: PCT/JP00/07242
§ 371 (c)(1),
(2), (4) Date: Oct. 1, 2002
(87) PCT Pub. No.: WO02/33702
PCT Pub. Date: Apr. 25, 2002
(51) Int. Cl.$^7$ ................................................. G11B 7/00
(52) U.S. Cl. .................. 369/112.02; 369/100; 369/103; 369/110.01
(58) Field of Search .......................... 369/275.1, 275.2, 369/275.4, 272, 283, 284, 100, 103, 110.01, 100.04, 112.01, 112.02, 112.16, 59.1, 47.1, 44.26

(56) References Cited

U.S. PATENT DOCUMENTS 5,059,000 A * 10/1991 Kaneko et al. ............... 349/20
6,045,888 A * 4/2000 Chen et al. ............... 369/275.1

FOREIGN PATENT DOCUMENTS

| EP | 387059 | 9/1990 |
|----|--------|--------|
| JP | 4-21820 | 1/1992 |
| JP | 4 156424 | 5/1992 |
| JP | 5 241151 | 9/1993 |
| JP | 7 101264 | 11/1995 |

* cited by examiner

*Primary Examiner*—Muhammad Edun
(74) *Attorney, Agent, or Firm*—Sonnenschein, Nath & Rosenthal LLP (57) ABSTRACT

A light orientation film and a liquid crystal thin film are formed adjacent to each other. Light is irradiated to the light orientation film and the liquid crystal thin film, so as to cause the light orientation film to be orientated while viscosity of the liquid crystal thin film is lowered by a temperature increase by the light irradiation, so that an intermolecular force on the boundary between the light orientation film and the liquid crystal thin film causes the liquid crystal molecules in the liquid crystal thin film to the orientation of the light orientation film. By this orientation of the liquid crystal molecules, recording information is maintained. Thus, it is possible to realize a sufficient signal amount while using the light orientation film as well as to obtain a thermal stability and a stability against light irradiation.

6 Claims, 3 Drawing Sheets

OPTICAL RECORDING MEDIUM AND OPTICAL RECORDING METHOD

BACKGROUND OF THE INVENTION

The present invention relates to a novel optical recording medium having a light orientation film in combination with a liquid crystal thin film and to an optical recording method.

BACKGROUND ART

Recently, research is widely made on application of a light orientation organic film using azobenzene as a recording material of an optical disc, for example.

An optical disc using a light orientation organic film is entirely made from an organic material and can be burnt down without leaving a harmful substance. This is a great advantage as compared to a magneto-optical medium and a phase-change recording medium which are now widely used as a rewritable optical recording medium, because ecology is also a great industrial problem.

A signal detection when the aforementioned light orientation organic film on an optical disc is based on a method for reading a birefringence caused when azobenzene is orientated.

However, the birefringence of the light orientation organic film is normally very small and accordingly, the film should have a great thickness to obtain a high modulation factor.

On the other hand, for a high-density recording on an optical disc, the lens numerical aperture NA should be increased and the light source should have a shorter wavelength. In this case, the focus depth becomes shallower and the recording film thickness should be reduced. This results in a small signal amount of the birefringence.

To cope with this, research has been made on a material having a great birefringence. However, the material preparation procedure is complicated, which is a problem for a mass production, and the erase characteristic is not sufficient.

Moreover, in general, such light orientation organic films also have a problem in thermal stability and in stability against light irradiation and still cannot be used in practice.

Furthermore, as the recording method of the aforementioned light orientation organic film, a method used records a molecule orientation direction as information utilizing that the molecule orientation direction is changed according to the polarization direction by irradiation of a linear polarization (light orientation). However, in an optical disc, light is also irradiated during reproducing and the reproducing light changes the molecule orientation direction, causing a problem that recorded information is lost.

In general, the ratio of the reproducing light and the recording light is about 1:10, and it is difficult to provide a greater difference because of the limit in the laser capability. Here, for example, when a reproducing is repeated 10 times, a light quantity equal to the light quantity for one recording is irradiated and the recorded information is lost by the reproducing.

To evade this, it is effective that the recording light source and the reproducing light source have different wavelength values so as to reduce absorption with respect to the reproducing light in the spectral characteristic.

However, according to this method two light sources having different wavelength values should be contained in one apparatus, which increases the apparatus size and cost. Moreover, for reproducing, long-wavelength laser such as red is used, which increases the focusing spot diameter, disabling to increase the recording density.

SUMMARY OF THE INVENTION

It is therefor an object of the present invention to provide a novel optical recording medium and an optical recording method using a light orientation film and yet capable of obtaining a sufficient signal amount as well as an excellent thermal stability and stability against light irradiation not causing loss of recorded information due to irradiation of the reproducing light.

The optical recording medium according to the present invention is characterized in that the light orientation film and the liquid crystal thin film are layered adjacent to each other and recorded information is maintained by orientation of liquid crystal molecules in the liquid crystal thin film.

Moreover, the optical recording method according to the present invention is characterized in that light is irradiated to an optical recording medium having a light orientation film and a liquid crystal thin film formed adjacent to each other, wherein the light orientation film is orientated and the viscosity of the liquid crystal thin film is lowered by the temperature increase by the light irradiation, so that liquid crystal molecules in the liquid crystal thin film are orientated according to the orientation of the light orientation film by the intermolecular force on the boundary between the light orientation film and the liquid crystal thin film and recorded information is maintained by this orientation of the liquid crystal molecules.

According to the present invention, a liquid crystal thin film is arranged adjacent to a light orientation film, so that recorded information is maintained in the liquid crystal thin film and recording/reproducing can be performed in a stable state. That is, the light orientation film is orientated while recording light is irradiated and liquid crystal molecules of the liquid crystal thin film are fixed in accordance with the light orientation film while being cooled down, thereby maintaining recorded information. According to this method, it is possible to perform recording and reproducing with a same wavelength, enabling to record with a high density.

Thus, the optical recording medium and the optical recording method according to the present invention utilizes the function of the light orientation film and the function of the liquid crystal thin film, thereby enabling to obtain a stable high-density recording/reproducing.

This provides an advantage that since the light orientation film is not directly used for signal detection and used only for orientation during recording, it is possible to reduce the film thickness of the light orientation film. Thus, the number of molecules to be orientated is reduced to increase the reaction speed. The reduced film thickness can have an effect to suppress the molecule orientation direction within the plane. Moreover, since permeability is increased, this is advantageous for multiple layers, which is advantageous to increase the density.

Moreover, since it is preferable that the birefringence of the light orientation film be smaller, this layer may be formed from a wide range of materials.

Furthermore, when using a fluorescent layer as the liquid crystal film, the fluorescence may have any wavelength values, thereby facilitating a signal detection in the case of a multi-layered medium. That is, since the wavelength is different from a signal from another layer, it is possible to ideally reduce the intersymbol interference between layers.

As the liquid crystal thin film, it is also possible to use a material having a great birefringence. In this case, it is possible to obtain a great signal detection even in the case of a single layer.

Moreover, even when the light orientation film has a low orientation degree, the liquid crystal thin film has a high orientation degree, thereby enabling to obtain an orientation degree increase effect.

Furthermore, the greatest effect of the present invention is that it is possible to perform recording/reproducing with a same wavelength which has been impossible in the case of a single light orientation film layer. Since it is possible to perform recording/reproducing using a blue light source, it is possible to obtain a high-density recording. The blue light source is also appropriate as an excitation light of fluorescence.

Moreover, since the materials used in this invention are all organic materials, they can be burnt down without leaving a harmful substance. This is a great advantage as compared to the magneto-optical recording medium and the phase change recording medium which are now widely used as the rewritable optical recording medium, because ecology is also a great industrial problem.

DETAILED DESCRIPTION OF THE INVENTION

Description will now be directed to the optical recording medium and the optical recording method according to the present invention with reference to the attached drawings.

Figure 1:
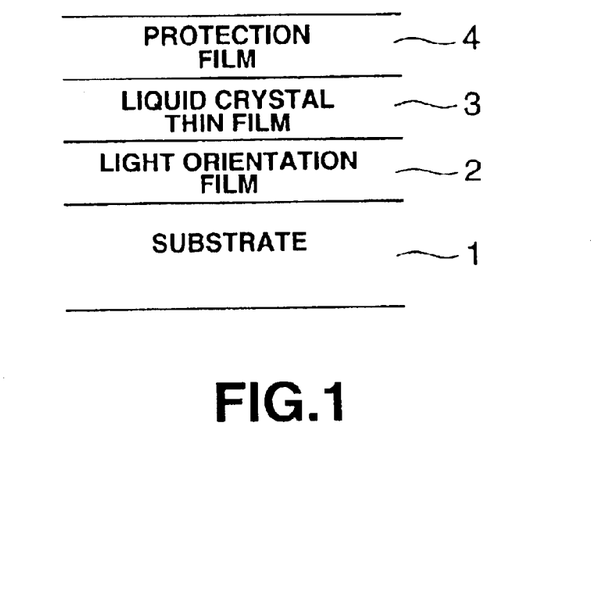
FIG. 1 is a cross sectional view of a configuration example of an optical recording medium according to the present invention.

Firstly, FIG. 1 shows a basic configuration of the optical recording medium according to the present invention.

The optical recording medium shown in FIG. 1 includes a light orientation film 2 and a liquid crystal thin film 3 which are successively formed on a substrate 1 and covered with a protection film 4, so that recording light and reproducing light are irradiated from the side of the substrate 1.

Figure 2:
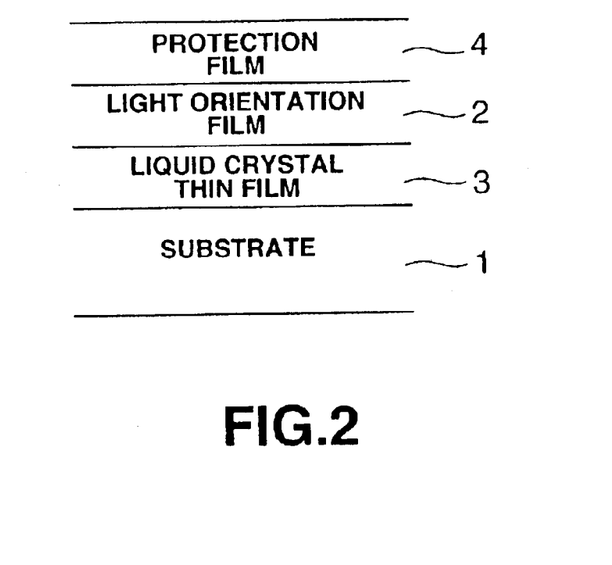
FIG. 2 is a cross sectional view of another configuration example of the optical recording medium according to the present invention.

Alternatively, as shown in FIG. 2, it is also possible to successively form the liquid crystal orientation film 3 and the light orientation film 2 in this order on the substrate 1, so that recording light and reproducing light are irradiated from the side of the substrate 1.

Here, the light orientation film 2 utilizes the photoisomerization reaction by, for example, azobenzene. The azobenzene has a structure shown in Chemical Formula (1).

trans-azobenezene     cis-azobenezene

The azobenzene have trans- and cis-isomers, from which the trans-azobenzene is thermally stable. When a linear polarization light is irradiated in parallel to the longer axis of the trans-form, the trans-form absorbs the light and is transformed into a cis-form but promptly returns to the trans-form. Here, the direction obtained may not be identical as before the excitation. Accordingly, if the linear polarization light is continuously irradiated, the azobenzene parallel to the polarization light is always excited and in an unstable position and finally, the azobenzene is orientated in the direction vertical to the linear polarization light.

It should be noted that in the optical recording medium according to the present invention, the orientation stability after shading the light to this light orientation film 2 has no relation to recording and accordingly, it is comparatively easy to obtain an optimal structure. However, since it is necessary to change the orientation of the liquid crystal thin film 3, it is preferable that the azobenzene be linked to a principal polymer chain.

That is, this principal polymer chain is moved by the azobenzene and the linkage between the principal polymer chain and the adjacent liquid crystal thin film 3 orientates the liquid crystal thin film and information is recorded on the liquid crystal thin film. The substitution groups $R_1$ and $R_2$ in the aforementioned azobenzene may be, for example, those shown in Chemical Formula (2) below.

It should be noted that it is also possible to change the orientation of the adjacent liquid phase without linkage to a principal polymer chain, as has been reported in the 18-th International Liquid Crystal Conference Abstract, 27B-5-1.

The aforementioned light orientation film 2 may have a film thickness sufficient for the light orientation film 2 to function. More specifically, thickness in the order of 10 nm or above is sufficient and the film thickness may be increased when the birefringence is small. In case the birefringence is great, the film thickness is preferably as small as possible because the polarization light is disordered before reaching the liquid crystal thin film 3 or the polarization light of the signal from the liquid crystal thin film 3 is disordered. Moreover, when the film thickness is small, the number of molecules to be orientated is also small, increasing the reaction speed and it is possible to expect the effect to suppress the orientation direction within the plane. Accordingly, the film thickness of the light orientation film 2 is preferably as small as possible. For example, it is preferably 30 nm or below.

On (under) the aforementioned light orientation film 2, the liquid crystal thin film 3 is layered adjacent to it.

The liquid crystal thin film 3 may be formed using any liquid crystal material. Here, a material causing fluorescence of linear polarization line parallel to the orientation direction is used as the liquid crystal film. More specifically, the material may be polyfluorene polymer.

Here, the polyfluorene polymer as the firefly luminescence liquid crystal has specific structures as follows.

This material may have various forms and some of them are shown as examples. By changing the structure of the polyfluorene, for example, according to the form of the optical recording medium, it is possible to change the emission spectrum.

Those having basic structures are shown in Chemical Formulae (3) to (6) and the molecular structures when the polymer has an end cap at both ends are shown in Chemical Formulae (7) to (9). When the end caps are provided, there is an advantage that the luminous efficiency of fluorescence and the polarization characteristic can be improved. Moreover, other examples are shown in Chemical Formulae (10) to (27).

(3)

(4)

(5)

(6)

(7)

(8)

(9)

(10)

(11)

(12)

(13)

(14)

(15)

(16)

(17)

(18)

(27)

The aforementioned liquid crystal thin film 3 is set to have a high viscosity at the room temperature and not to change its orientation direction easily. During recording, the temperature is increased by the light irradiation to lower the viscosity and the orientation direction is easily changed. As a result, the intermolecular linkage with the molecules of the light orientation film 2 orientates the liquid crystal thin film 3 in the same direction as this. Even after the light is shaded, this direction is maintained, the viscosity is increased, and information is maintained.

The light orientation film 2 and the liquid crystal thin film 3 are both formed by the spin coat method. It should noted that these may also be formed by deposition. In the case of the spin coat method, the light orientation film 2 is normally a material having a low solubility with respect to a solvent and accordingly, as the solvent, THF (tetrahydrofuran) is used for example. On the contrary, this is advantageous for the spin coat of the liquid crystal thin film 3 because the light orientation film 2 will not be solved while spin-coating the liquid crystal thin film 3. As the solvent of the liquid crystal thin film 3, a material having a higher solubility is used. More specifically, there can be exemplified toluene. It should be noted that when the light orientation film 2 also has a high solubility, the deposition method can be used.

The protection film 4 is formed from an ultraviolet ray setting resin generally used in the optical recording medium. However, it dissolves the liquid crystal thin film 3 during spin coating and accordingly, a dielectric body such as SiN and SiO is formed with a thickness of 50 nm to 100 nm between the protection film 4 and the liquid crystal thin film 3.

As the substrate 1, a substrate having a guide groove formed in a spiral shape is used in the same way as in the optical recording medium having a magneto-optical recording film or a phase change film as the recording layer. The substrate 1 has optimal structure and dimensions so as to obtain preferable focus and tracking characteristics in accordance with the optical system.

The substrate 1 may also be made from polycarbonate. However, when spin coating the light orientation film 2, the substrate 1 is also dissolved because of a high solubility of the solvent. Accordingly, a dielectric layer of SiN or SiO is formed with a thickness of 50 nm to 100 nm between the light orientation film 2 and the substrate 1. Here, because an optical multi-interference is present, the film thickness of the dielectric layer is set so as to detect a maximum signal.

In the optical recording medium having the aforementioned configuration, information recording is realized by utilizing the high temperature increase so as to align the orientation direction of the liquid crystal thin film 3 vertical to the incident linear polarization light. That is, in the same way as the magneto-optical recording film and the phase change film, during recording, light of a higher intensity is introduced only into the recording mark, and during reproducing, light having a low intensity not causing temperature increase is introduced to detect a signal. The light orientation film 2 is a so-called photon mode which changes the orientation degree according to the light quantity. However, since actual recording is performed in the liquid crystal thin film 3, recording is performed including the so-called thermal mode where a critical temperature is present.

Since the light orientation film 2 is a photon mode, the orientation degree is low unless sufficient light irradiation is present. However, the liquid crystal thin film 3 in which linkage force between molecules is strong has a high orientation degree. Accordingly, even when the orientation degree of the light orientation film 2 is low, the liquid crystal thin film 3 aligned with that direction increases its orientation degree. In other words, it is possible to obtain a reinforcement effect of the orientation degree. That is, since the light orientation film 2 need not be orientated sufficiently, it is possible to obtain a high-contrast recording with a low energy.

Here, explanation will be given on the characteristic of the liquid crystal thin film 3 emitting the fluorescence.

Figure 3:
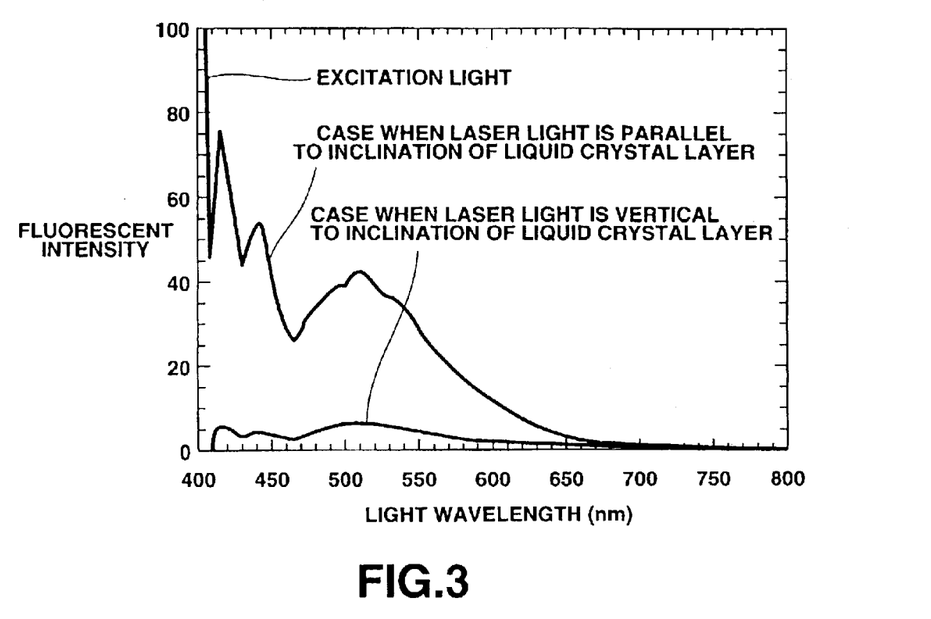
FIG. 3 is a graph showing polarization characteristics of fluorescence when a linear polarization light is incident to polyfluorene polymer.
Figure 4:
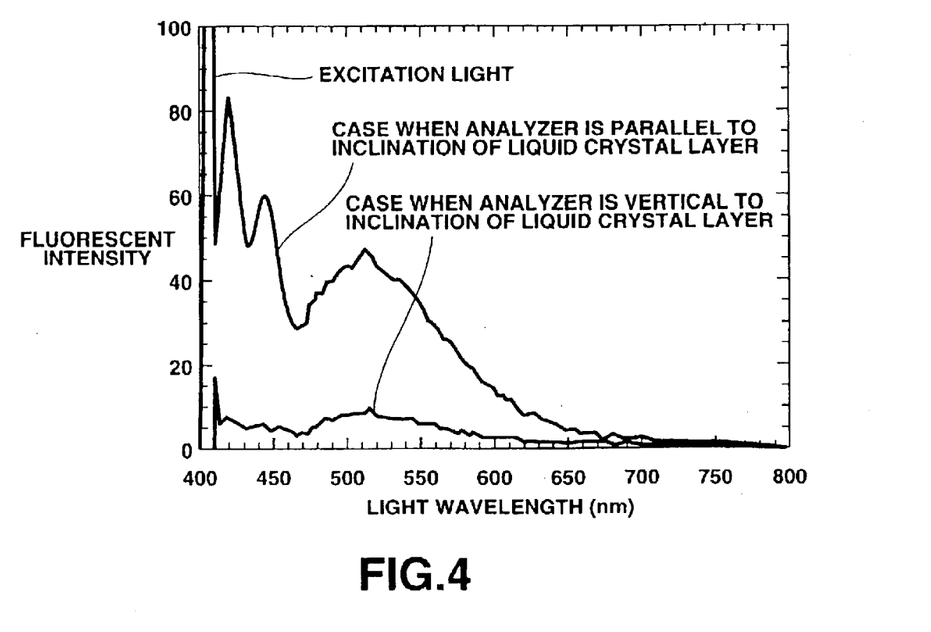
FIG. 4 is a graph showing polarization characteristics of fluorescence when a circular polarization light is incident to polyfluorene polymer.

By using a polyimide film as the undercoat instead of the light orientation film 2, firefly luminescence was measured according to the polyfluorene polymer orientation difference on this polyimide film. The measurement results are shown in FIG. 3 and FIG. 4. These figures show the measurements on the polyimide and the same can be obtained on the orientated light orientation film 2. It should be noted the polyimide used as the polyimide film has a structure shown in Chemical Formula (28).

(28)

FIG. 3 shows fluorescence incident with linear polarization light when the excitement light is 407 nm: spectrum when the polyfluorene orientation direction is parallel to the laser direction and a spectrum when it is vertical to the laser direction. As shown in this figure, the fluorescent intensity is great when the excitation light has a polarization direction parallel to orientation direction. Accordingly, for example, when the orientation direction during erase is vertical to the orientation direction of the recording mark so that the linear polarization light is introduced as a reproducing light, the fluorescent intensity modulation can be observed.

FIG. 4 shows polarization characteristic of the fluorescence when a laser light is incident as a circular polarization light into the polyfluorene polymer. That is, FIG. 4 shows a spectrum of observed light quantity when an analyzer is arranged in front of the detector and its angle is set to parallel and vertical to the excitation light. As shown in this figure, the fluorescence itself is a linear polarization light. That is, when the polyfluorene orientation direction is recorded vertical between the erase and the recording mark, fluorescent intensity modulation can be observed by observing the excitation light with reproducing light of the circular polarization light and by arranging an analyzer in front of the detection detector.

While explanation has been given on a case that the liquid crystal thin film 3 is formed from polyfluorene polymer, the liquid crystal thin film 3 may be formed from other materials.

That is, it is possible to select a material to be used for the liquid crystal thin film 3 such that the material itself has no luminous characteristic but has a preferable linkage characteristic with the light orientation film 2.

This liquid crystal thin film is doped in a two-color fluorescent pigment so as to be linked as a liquid crystal material and orientated. The two-color fluorescent pigment, for example, may be a pigment as shown in Chemical Formula (29) below. It should be noted that R in the Chemical Formula represents an alkyl chain.

(29)

In this case, instead of using a liquid crystal material containing luminous molecules such as polyfluorene polymer, liquid crystal molecules and luminous molecules are separately selected to be mixed. This increases the material selection range, facilitating to obtain an optimal material.

Next, explanation will be given on a case using a material having birefringence as the aforementioned liquid crystal thin film.

Figure 5:
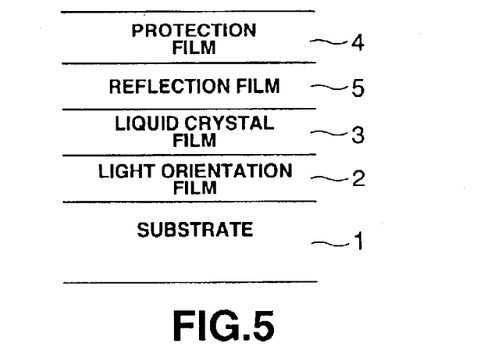
FIG. 5 is a cross sectional view of a configuration example of an optical recording medium using a liquid crystal thin film of having birefringence.

There are a wide variety of liquid crystal materials having a large birefringence. Basically, the molecular structure needs to be bar-shaped. FIG. 5 shows a basic film configuration.

This is basically identical the one shown in FIG. 1. However, the polarization light is rotated and reflected by birefringence and the resultant light is detected. Accordingly, a reflection film 5 is arranged on the liquid crystal thin film 3.

When the reflection film 5 is a metal film having a high reflectance, the film thickness is preferably 40 nm or above.

As a metal having a high reflectance, there can be exemplified Al and Ag. Instead of using a metal film as the reflection film 5, it is also possible, for example, to layer dielectric layers having different refractive indexes so as to obtain a high reflectance. This can be utilized when thermal conductivity of the metal film is too high and the thermal characteristic is not preferable.

The film thickness of the liquid crystal thin film 3 is set to about $d=\lambda/8\Delta n$ wherein $\Delta n$ represents the birefringence value.

The linear polarization light during reproducing is incident with a tilt of 45 degrees from the orientation direction. This makes the polarization light reflected to be a circular polarization light with its direction as right circular polarization light or left circular polarization light depending on the orientation direction.

Here, the reason why the setting is not accurately but about $d=\lambda/8\Delta n$ is that reflection is caused by the boundary with the light orientation film and the boundary between the light orientation film and the substrate, causing optical multi-interference effect. As a result, the film thickness for the incident light to be a circular polarization light is slightly shifted from $d=\lambda/8\Delta n$. The accurate film thickness should be properly set by calculating this multi-interference.

Lastly, explanation will be given on a case using a material having firefly luminescence as the liquid crystal thin film and using a pair of the light orientation film and the liquid crystal thin film in multiple layers.

Figure 6:
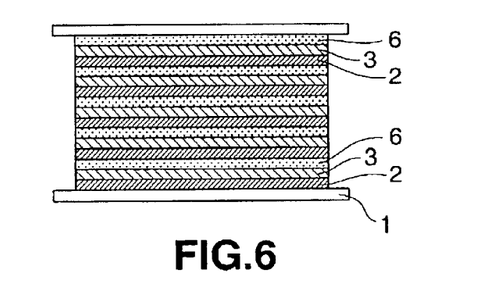
FIG. 6 is a cross sectional view of an example of the optical recording medium having a multi-layered structure.

In the optical recording medium of this example, it is possible to perform a multi-layer recording, enabling to realize a high density. This configuration is shown in FIG. 6.

In this example, a plurality of pairs of the light orientation film 2 and the liquid crystal thin film 3 are layered via a buffer layer 6.

The light orientation film 2 and the liquid crystal thin film 3 are formed in the same way as the example shown in FIG. 1. The difference from FIG. 1 is the presence of the buffer layer 6 arranged between the pairs. This serves to isolate each recording layer by more than the optical focus depth, so that even when focused on any of the layers, it is possible to obtain an effect to suppress the intersymbol interference from the other layers to a minimum value.

For this, the buffer layer 6 need to have a film thickness of several micrometers or above and isolate the respective pairs by this film thickness. For example, it is set to 10 micrometers in this example.

The buffer layer 6 should be formed from a transparent material. In this example, an ultraviolet ray setting resin is used but it is also to use polycarbonate and an adhesive. To suppress the light absorption, the light orientation film 2 and the liquid crystal thin film 3 preferably have a thin film thickness.

Figure 7:
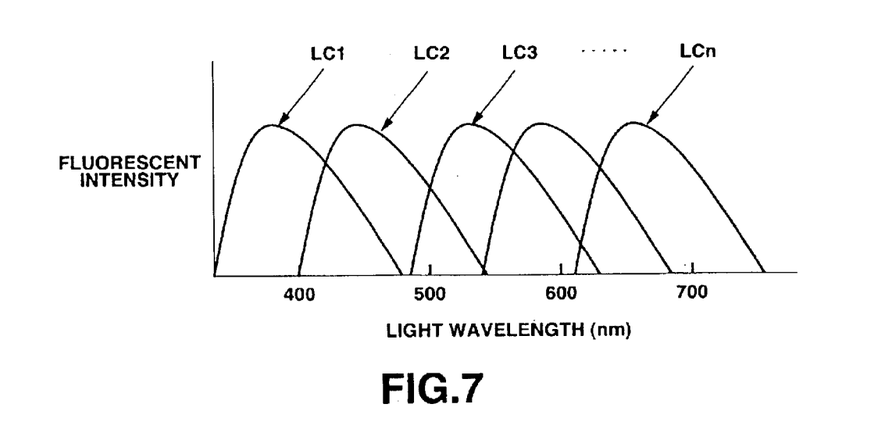
FIG. 7 is graph showing setting examples of emission spectrum of the respective liquid crystal thin films in a multi-layered structure.

In the case of multiple layers, the liquid crystal thin film 3 is set so that each pair has different wavelength values of emission spectrum as shown in FIG. 7.

For example, when the liquid crystal thin films 3 are called LC1, LC2, and the like starting from the one nearer to the substrate 1, the LC1 is set to emit fluorescence having the shortest wavelength and the LC2 is arranged to have a different molecular structure so as to have a slightly longer wavelength of spectrum. LC3 and after are arranged in the same way.

During reproducing, by using a color filter or prism, it is possible to suppress signal leak from the other layers, thereby improving the S/N and increasing the recording density.

It should be noted that in the case of a ROM optical disc, the buffer layer 6 can be set to have a thin thickness so as to suppress all the layers within the focus depth, thereby simultaneously detecting fluorescence from all the layers and isolate signals according to the light wavelength values. Thus, it is possible to realize an optical disc having a high-density and a high transfer rate.

What is claimed is:

1. An optical recording medium including a light orientation film and a liquid crystal thin film layered adjacent to each other, and a recording information maintained by the orientation of the liquid crystal molecules in the liquid crystal thin film, wherein the liquid crystal thin film emits fluorescence as linear polarization light parallel to the orientation direction.

2. The optical recording medium as claimed in claim 1, wherein the fluorescence is maximum when the polarization direction of the excitation light is approximately parallel to the molecule orientation direction and minimum when it is approximately vertical to the molecule orientation direction during the linear polarization light is irradiated to the liquid crystal thin film as the excitation light.

3. The optical recording medium as claimed in claim 1, wherein the liquid crystal thin film is formed from a material containing polyfluorene polymer as the liquid crystal molecule.

4. The optical recording medium as claimed in claim 1, wherein the light orientation film and the liquid crystal thin film constitutes a pair, and at least two sets of the pair are layered via a buffer layer made from a material capable of light transmission.

5. The optical recording medium as claimed in claim 1, wherein the light orientation film and the liquid crystal thin film constitutes a pair, and each pair of the liquid crystal thin film emits fluorescence having different wavelength values each other.

6. An optical recording method comprising:

a step of irradiating light to an optical recording medium having a light orientation film and a liquid crystal thin film formed adjacent to each other by light source moving relatively, orientating the light orientation film and lowering a viscosity of the liquid crystal thin film by a temperature increase caused by the light irradiation, so that an intermolecular force on the boundary between the light orientation film and the liquid crystal thin film causes liquid crystal molecules in the liquid crystal thin film to be orientated according to the orientation of the light orientation film, and a step of maintaining recorded information by fixing liquid crystal molecules of the liquid crystal thin film in accordance with the orientation of the light orientation film while being cooled down after the light irradiation.

* * * * *